(12) United States Patent
Paczkowski et al.

(10) Patent No.: US 10,251,053 B1
(45) Date of Patent: Apr. 2, 2019

(54) EMBEDDED SUBSCRIBER IDENTITY MODULE (ESIM) IMPLEMENTATION ON A WIRELESS COMMUNICATION DEVICE USING DISTRIBUTED LEDGER TECHNOLOGY (DLT)

(71) Applicant: Sprint Communications Company L.P., Overland Park, KS (US)

(72) Inventors: Lyle W. Paczkowski, Mission Hills, KS (US); William M. Parsel, Overland Park, KS (US); Robert L. Spanel, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 3 days.

(21) Appl. No.: 15/666,564

(22) Filed: Aug. 2, 2017

(51) Int. Cl.
*H04W 8/22* (2009.01)
*H04W 88/02* (2009.01)

(52) U.S. Cl.
CPC .............. *H04W 8/22* (2013.01); *H04W 88/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,990,504 B1* | 6/2018 | Chapman | | H04L 9/3231 |
| 2017/0031676 A1* | 2/2017 | Cecchetti | | G06F 8/65 |
| 2017/0221052 A1* | 8/2017 | Sheng | | G06Q 20/3678 |
| 2017/0295232 A1* | 10/2017 | Curtis | | G06F 9/466 |
| 2017/0352219 A1* | 12/2017 | Spanos | | G07C 13/00 |
| 2018/0102013 A1* | 4/2018 | Spanos | | G06F 21/64 |
| 2018/0144292 A1* | 5/2018 | Mattingly | | G06Q 10/087 |
| 2018/0174122 A1* | 6/2018 | Mattingly | | G06Q 30/0631 |
| 2018/0181768 A1* | 6/2018 | Leporini | | G06F 21/6209 |
| 2018/0191503 A1* | 7/2018 | Alwar | | G06Q 20/065 |
| 2018/0211524 A1* | 7/2018 | Furuichi | | G08G 1/162 |
| 2018/0219669 A1* | 8/2018 | Chen | | H04L 9/002 |
| 2018/0248699 A1* | 8/2018 | Andrade | | H04L 9/3231 |
| 2018/0253691 A1* | 9/2018 | High | | G06Q 10/08355 |
| 2018/0253702 A1* | 9/2018 | Dowding | | G06Q 20/06 |
| 2018/0268360 A1* | 9/2018 | Millhouse | | G06Q 10/0833 |
| 2018/0278427 A1* | 9/2018 | Thakore | | H04L 9/3268 |
| 2018/0294957 A1* | 10/2018 | O'Brien | | H04L 9/0643 |
| 2018/0294967 A1* | 10/2018 | Roberts | | H04L 9/3236 |
| 2018/0302222 A1* | 10/2018 | Agrawal | | H04L 9/3213 |

* cited by examiner

*Primary Examiner* — Nay A Maung
*Assistant Examiner* — Erica L Fleming-Hall (57) ABSTRACT

A method of storing device information, provisioning data, and event information using distributed ledger technology (DLT). a manufacturer creates a first block of a first category comprising wireless communication device information, the block stored in a non-transitory memory of the device, a wireless communication service provider provisions device on a network, a server maintained by the wireless communication service provider creates a second block of a second category comprising information associated with the provisioning of the device, an application executing on the device stores the second block by in the non-transitory memory, creating a chain of blocks, the application uses at least part of the chain of blocks to provide authentication of the device to the network, and the block foundry server creates at least one block of a third category.

20 Claims, 7 Drawing Sheets

EMBEDDED SUBSCRIBER IDENTITY MODULE (ESIM) IMPLEMENTATION ON A WIRELESS COMMUNICATION DEVICE USING DISTRIBUTED LEDGER TECHNOLOGY (DLT)

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless network capable electronic devices are becoming increasingly prevalent in our daily lives. More and more electronic devices that did not have network capabilities previously are now built to be network capable. The electronic devices may communicate with one another via the network. Parties associated with the electronic devices may want to monitor the operations of the electronic device and collect information regarding its events or environment for analytics. Electronic devices may be configured by a company to function on a certain wireless network. The electronic device may also switch owners during its life and this may result in a desire to switch wireless networks of which the device is configured to operate.

SUMMARY

In an embodiment, a method of storing provisioning data and device information using distributed ledger technology (DLT) is disclosed. The method comprises, creating, by a manufacturer via a block foundry server, a first block of a first category comprising wireless communication device information, comprising a block number, a hash, a nonce, a timestamp, and a plurality of fields, the block stored in a non-transitory portion of memory of the wireless communication device, provisioning, by a wireless communication service provider, the wireless communication device on a network, and creating, by a server maintained by the wireless communication service provider, a second block of a second category comprising information associated with the provisioning of the wireless communication device, wherein the second block comprises a block number, a hash, the hash of the first block, a nonce, a timestamp, and a plurality of subscription information. The method further comprises, storing the second block by an application executing on a processor of the wireless communication device in the non-transitory memory, creating a chain of blocks, wherein the hash of the first block links the second block and the first block and using at least part of the chain of blocks by the application to provide authentication of the wireless communication device to the network.

In another embodiment, a wireless communication device is disclosed. The wireless communication device comprises a processor, a radio transceiver, a non-transitory memory, and a chain of blocks stored in the non-transitory memory. The chain of blocks comprises a first block of a first category comprising device information and at least one second block of a second category comprising network provisioning information and at least one branching instruction, wherein the branching instruction comprises block creation request logic and block access logic, wherein when triggered by the block creation request logic of the at least one branching instruction, an application stored in the non-transitory memory executing on the processor sends a block creation request to a block foundry server in the network, and when access is requested to view the chain of blocks, the block access logic of the at least one branching instruction determines to grant the viewing access.

In yet another embodiment, a method of preserving event information of a wireless communication device using distributed ledger technology (DLT) is disclosed. The method comprises creating, by a manufacturer via a block foundry server of a wireless communication device, a first block of a first category comprising a block number, a hash, a nonce, a timestamp, and a plurality of fields, the plurality of fields comprising wireless communication device information, wherein the first block is stored in a non-transitory memory of the wireless communication device, provisioning, by a wireless communication service provider, the wireless communication device on a network, and creating, by the wireless communication service provider via the block foundry server, a second block of a second category comprising a block number, a hash, the hash of the first block, a nonce, a timestamp, and a plurality of subscription information associated with the provisioning. The method further comprises storing the second block by an application executing on a processor of the wireless communication device in the non-transitory memory, creating a chain of blocks, wherein the hash of the first block links the second block and the first block, and creating by the block foundry server at least one block of a third category comprising a block number, a hash, the hash of the previous block, a nonce, a timestamp, and a plurality of event information records.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Some wireless communication devices such as mobile communication devices traditionally comprise a hardware location for a physical subscriber identity module (SIM) card which stores data comprising network information used to authenticate and identify subscribers on a wireless communication network. Sometimes, a SIM card may be configured so that a mobile device using that particular SIM card works on a specific service provider's wireless network. Mobile device users may purchase a new SIM card if they wish to change wireless communication service providers. In some countries, mobile communication devices that have multiple slots so that more than one SIM card can be used are common, where the mobile communication device user may use SIM cards from different server providers. More recently, embedded SIMs (e-SIMs) have been developed to provide the same services, but instead of a physical chip, e-SIMs may be soldered directly onto a circuit board of the mobile communication device. E-SIMs allow for remote provisioning, which may enable mobile communication devices to change wireless communication service provider subscriptions more efficiently, since users do not have to wait for a new physical SIM card.

As more and more electronic devices become capable of connecting to and communicating through a wireless communication network, e-SIMs may expand from mobile wireless communication devices to a plethora of other electronic devices. These electronic devices may be wireless communication devices commonly referred to as the Internet of Things (IoT), which are physical objects embedded with electronics, software, sensors, and/or other components that allow for network connectivity. IoT devices may range from lightbulbs, to automotive vehicles, to statues, to HVAC systems and countless other possibilities. The cost of a physical e-SIM as a hardware component of the device may be exceedingly expensive compared to the price of the IoT device itself. For example, an e-SIM may cost five dollars to implement on a device, and the wireless network-enabled device may be a five dollar lightbulb.

Companies may desire to collect and analyze data collected from these IoT devices for a variety of purposes such as optimizing, marketing, and/or improving their products. The vast amount of data generated and collected from devices and stored in data stores on the network may strain network infrastructure and companies may inefficiently dissect the data to find helpful information. Furthermore, competing companies may view each other's data without consent from the owner and manufacturer of the device. The data stores may not securely store the device data; therefore, the device data may also be subject to illegitimate modification or corruption from other parties in the network.

The present disclosure teaches using distributed ledger technology (DLT) to store information associated with a wireless communication device and provide at least part of that information to the network for authenticating the wireless communication device. The information may comprise device information, provisioning information, and event information stored in a plurality blocks that form a chain of blocks. Device information may include data about the physical components that make up the device including hardware component serial numbers, the media access control (MAC) address of the device, the international mobile equipment identity (IMEI) and other information related to the device such as the date of manufacture, the time of manufacture, the location of manufacture, the name of manufacturer, and/or the purpose of device. Provisioning information may include information such as the wireless communication service provider, the service provider network, the international mobile subscriber identity (IMSI), and other subscription details. Event information may comprise a variety of data related to the conditions and/or actions that occur on or in the environment of the device. The information stored in the blocks may depend on the purpose of the device. Using DLT may result in a cheaper way to store e-SIM information as well as a more secure way to store device activity information that prevents information from being maliciously altered.

Distributed ledger technology (DLT) maintains records in a secure manner by a consensus mechanism amongst nodes in the network to prevent modification of the records. The distributed database may be spread across multiple sites, regions, and/or parties. DLT may be used to validate and authenticate data exchanges. Records may be stored in the network once a majority of the nodes in the network achieve consensus. In some forms of DLT, blocks are used to store information and then connected in a chronological technique to form a linked chain of blocks. The linked chain of blocks are resistant to modification of the data stored within a block, where changing or deleting information in a block in the linked chain of blocks invalidates the subsequent blocks. One skilled in the art understands the process of how DLT is used to securely store records, but a basic description is provided here. A block typically comprises at least a block number, a nonce value, a timestamp, a plurality of information (e.g., device information, provisioning information, event information), a hash value, and the hash value of the previous block. A block may further comprise at least one pointer that references to at least one of a prior block in the chain. A hash is a string of data with a given size (e.g., 16-bits, 32-bits, 64-bits) that is based on the information in the block (e.g., the block number, the nonce value, the information, and the previous hash).

In order to successfully create a block, a target hash value may be designated. A target hash value may be established to have a certain number of leading zeros in the hash. The nonce value is incrementally varied in order to solve the hash to satisfy the target hash value based on a hashing function (e.g., SHA-1, SHA-256, SHA-512, SHA-3). No meaningful data can be derived from the hash of the block. In other words, the data in the block cannot be back-solved based on the hash. The nodes in the network collectively validate new blocks when a request is sent. Once a block is validated and stored in a chain, it cannot be retroactively altered without invalidating the subsequent blocks. Typically, blocks are validated on a majority rule (e.g., 50%+1 vote) in the network, wherein the majority of nodes in the network are in consensus, or agreement. Each block comprises the hash and the hash of the previous block, which links the two blocks. Therefore, if a validated block within the chain is altered or deleted, the hashes of the succeeding blocks in the chain would become invalid, which would indicate that the chain has been corrupted.

In an embodiment, the information associated with the IoT device may be stored in three different categories of blocks. For example, device information may be stored in a first category of block, referred to in the present disclosure as a birth block. The birth block may be created by a server maintained by an original equipment manufacturer (OEM)

of the device. Provisioning information may be stored in a second category of block, referred to in the present disclosure as a life block. If the provisioning of the device changes during the life of the device, a new life block may be created. The life block(s) may be generated by a server maintained by a service provider or carrier upon provisioning of the device. Event information may be stored in a third category of block, referred to in the present disclosure as an event block. Event blocks may be created by a block foundry in the network pursuant to a block creation request by the device. In addition to event information, life blocks may comprise a plurality of branching instructions that notify the device the circumstances of when to request an event block. In an embodiment, at least part of the combination of the birth block and the life block may comprise e-SIM information that provides credentials for device authentication on the network.

In an embodiment, the birth block may be created by an original equipment manufacturer (OEM) of the device. The device may comprise hardware components from a variety of manufacturers. Each hardware component may comprise a serial number. The birth block may comprise a plurality of fields and store the serial numbers of the hardware components of the device in addition to other identifiers such as the media access control (MAC) address of the device, the international mobile equipment identity (IMEI). Furthermore, the birth block may comprise information related to the creation of the device such as the location of manufacture, the date of manufacture the time of manufacture, the purpose of the device (e.g., mobile communication device, automotive vehicle, laundry machine). The birth block may be created by a block foundry server in the network upon request by the OEM. Once the birth block is hashed and validated by the plurality of consensus servers in the network, it may be stored in a block data store on the network and/or in the non-transitory memory of the device. In an embodiment, a single birth block may exist for the life of a given device.

The device may then be shipped to a vendor and stored in inventory prior to purchase by a customer. When purchased by a customer, the device may be activated and provisioned on a wireless communication network. For example, the device may be provisioned on a radio access network (RAN) by a wireless communication service provider. In another example, a car dealership may register a wireless enabled head unit installed in a vehicle on a wireless communication network to a customer upon purchase. In some embodiments, customers may provision the device themselves using a serial identifier of the device with the manufacturer directly, for example, through a website or phone call. When the device is provisioned, the service provider or carrier may request a life block to be created by the block foundry server. The life block may comprise provisioning information including but not limited to the service provider, the service provider network, the international mobile subscriber identity (IMSI), the phone number, the mobile directory number (MDN), and other subscription details (e.g., preferred roaming lists, network services).

The information contained in the life block may include a block number, the hash of the previous block, a nonce value, a timestamp, and a plurality of provisioning information. In the case of the first life block in a chain, the hash of the previous block may be the hash of the birth block. The life block may then be hashed and stored with the birth block. The combination of the birth block and life block may comprise e-SIM information that the wireless communication device may send to the network for device authentication purposes that allow the wireless communication device to connect and function on the network. The life block may be linked to the birth block by the previous hash to form a chain of blocks. Since a block depends on the previous blocks in the chain, the blocks in the chain may not be altered without corrupting the chain in a detectable manner.

An application may reside in the non-transitory memory of the device. In an embodiment, the application may be a distributed application (DApp). The DApp may manage the chain of blocks. Managing the chain of blocks may include determining when to request a block, determining when to notify a user or administrative personnel of events that have occurred on the device, and/or determining where to store a block on the device. The DApp may request new life blocks or new event blocks from the block foundry server in the network. The DApp may notify a user if a significant event has occurred associated with the device.

In an embodiment, a life block may further comprise a plurality of branching instructions. The branching instructions may comprise logic that determines when the DApp may request a new life or event block and/or comprise logic that defines who or what may access and read data from the chain of blocks. The branching instructions may be sent from the network to the device. For example, the service provider may send a plurality of branching instructions to the device. Branching instructions may be conditional statements that tell the DApp to request a block in response to a certain event or plurality of events occurring. When branching instructions are received by a device, they may be incorporated into a new life block. When an event on the device triggers at least one of the branching instructions, the device may send a notification informing the DApp of the event. In an embodiment, the device may comprise sensors that monitor the internal and external conditions of the device. The DApp may determine to request an event block from the block foundry server, and the event block may be created and transmitted to the device after consensus is reached. The new event block may also be transmitted to the block data stores in the network and added to the chain of blocks associated with the device. The DApp may add the event block to the chain of blocks that is stored on the device.

As mentioned above, branching logic may also comprise instructions about what entity or individual may view information in the chain of blocks that may be classified as private. Certain fields in the block may comprise filters that sort the information based on a level of confidentiality. For example, a device user may not desire for his or her information be widely available to all parties on the network. The user may desire relevant companies to be able to access and read the chain of blocks associated with the device. For example, a life block may allow for the service provider of the device to read the details of the device owner's identity. The life block may deny access to other service providers who attempt to read the identity information. Manufacturers of the device may not wish for competitors to locate special information about the device and steal their implementations. The branching logic may be applied to both the chain of blocks stored on the device and to the block data stores in the network.

Event blocks may be requested from the block foundry server when the DApp is triggered by a branching instruction in the life block. In addition to the general block number, hash, hash of the previous block, nonce value, and timestamp, an event block may comprise a plurality of event information. In an embodiment, a device may not record every instance of an event. For example, a branching logic may be a sensor of a refrigerator notifying the DApp if the temperature in the refrigerator exceeds 50 degrees Fahrenheit for less than one minute over a period of one week. The refrigerator may have exceeded 50 degrees twenty times during the week, but the event block may describe the events with a yes or no indicator. For another example, the branching logic may be a sensor of a refrigerator notifying the DApp when the temperature in the refrigerator exceeds 60 degrees Fahrenheit for over thirty minutes. The DApp may request an event block from the block foundry server and notify the owner of the refrigerator of the event that the food in the refrigerator may be spoilt.

In an embodiment, a chain associated with a device may comprise more than one life block. For example, if a device changes owners or experiences a change in provisioning (e.g. adding new services to a service plan, updating information), a new life block may be created by the block foundry server. In another instance, a device may be taken off the network (decommissioned) for an extended period of time and recommissioned on the network. Due to the large gap in time, a new life block may be created. A new life block may also be created if the branching instructions change. The new life block may be implemented at the end of the chain of blocks as the most recent block. Event blocks may be created after the new life block. In an embodiment, the new life block may void previously established life blocks in the chain. For example, a new life block may comprise different branching instructions than a previous life block. Therefore, the branching instructions of the previous life block may be considered null. In an embodiment, an event block may comprise a pointer that references the most recent life block. The pointer may be information that identifies a block in the chain such as a block number. When the device is permanently taken out of commission or destroyed, a final event block may be created for the chain of blocks. The final event block may be stored along with its associated chain of blocks in the block data store on the network. The chain of blocks may be archived on the block data store.

At least a portion of the chain of blocks may provide e-SIM credentials to the network for device authentication purposes. For example, the birth block and life block in combination may comprise e-SIM information. In an embodiment, the device may provide e-SIM credentials to a cell tower of the network. An application on the device may locate the e-SIM information from the chain of blocks and provide the relevant information to the network. In another embodiment, the cell tower may be configured to find the e-SIM information from the chain of blocks. For example, a device may be powered off and powered on. The device may provide its e-SIM credentials obtained from the birth and life blocks.

Figure 1:
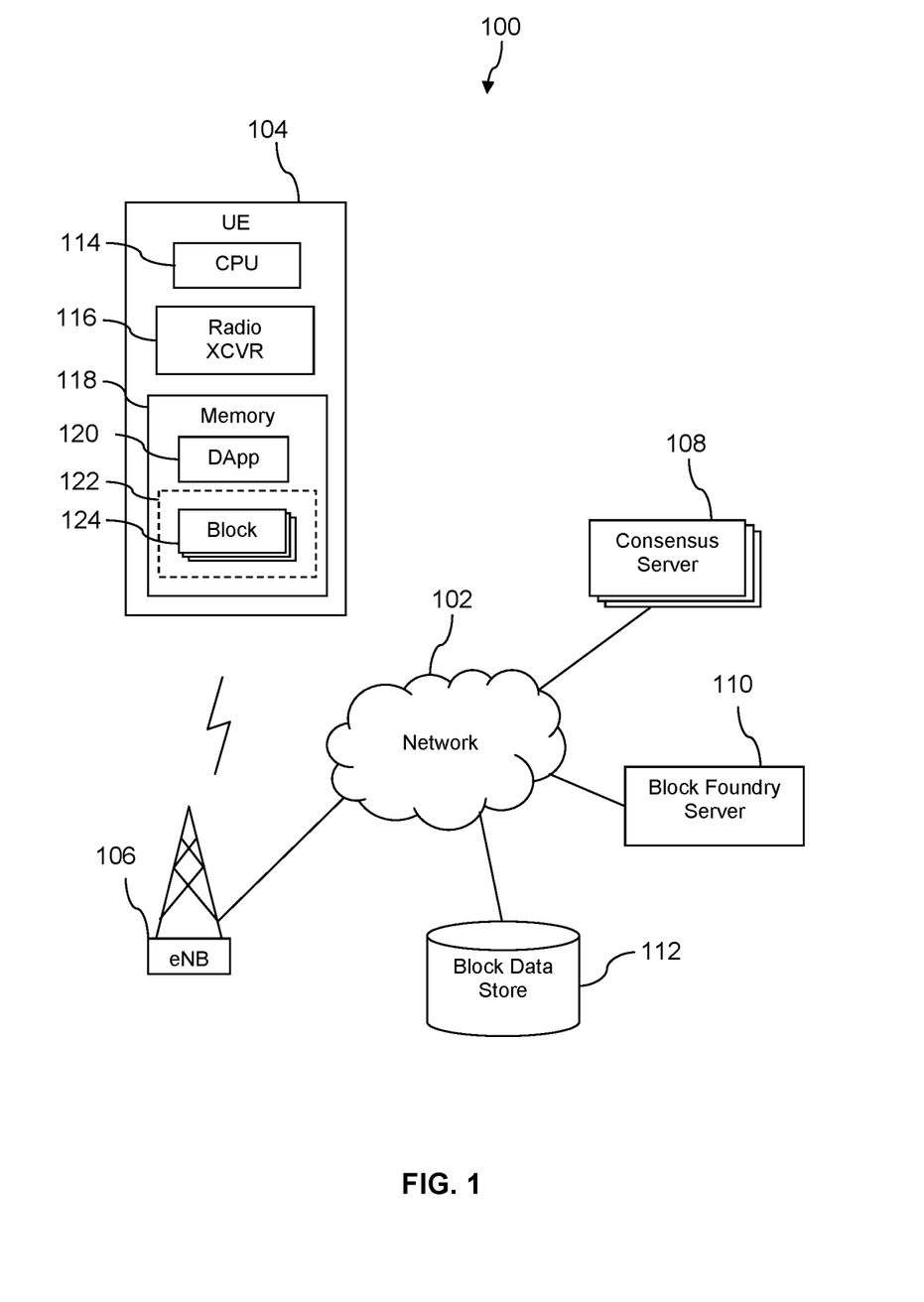
FIG. 1 is a block diagram of a wireless communication network according to an embodiment of the disclosure.

Turning now to FIG. 1, a system 100 is described. In an embodiment, the system 100 comprises a network 102, a user equipment (UE) 104, an eNodeB (eNB) 106, a plurality of consensus servers 108, a block foundry server 110, and a block data store 112. The UE 104 may alternatively be referred to in some contexts as a mobile communication device. The UE 104 may comprise a processor 114, a radio transceiver 116, and a memory 118 with a non-transitory portion comprising an application 120 and a chain of blocks 122. The chain of blocks 122 may comprise of individual blocks 124. In some embodiments, the application 120 may be a distributed application (DApp 120).

The UE 104 may be configured to use the radio transceiver 116 to establish a wireless communication link with an eNB 106 to provide access to the network 102. The radio transceiver 116 of the UE 104 may communicate with the eNB 106 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. In some contexts, the eNB 106 may be referred to as a base transceiver station (BTS) or a cell tower. The network 102 may comprise one or more private networks, one or more public networks, or a combination thereof. For example, the network 102 may be a wireless communication network of a wireless communication service provider. The UE 104 may access the network 102 to obtain a variety of communication services. The network 102 may request authentication of the UE 104 prior to conducting the communication services.

The UE 104 may be a mobile smart phone, a media player, a personal digital assistant (PDA), a laptop computer, a notebook computer, a tablet computer, a wearable computer, a headset computer, an Internet of Things (IoT) device, or another network communications capable device. It is understood that any number of UEs 104, any number of eNBs 106, any number of consensus servers 108, and any number of block data stores 112 may exist in the system 100. The network 102 may be a radio access network (RAN). In an embodiment, the UE 104 may have other components, which are not shown, such as a near field communication (NFC) radio transceiver, a short range radio transceiver such as a WiFi radio transceiver (AP), or other components. The plurality of consensus servers 108, the block foundry server 110, and the block data store 112 may be server computers. In an embodiment, the plurality of consensus servers 108 may each be in different geographical locations. The plurality of consensus servers 108, the block foundry server 110, and the block data store 112 may be maintained by a wireless communication service provider.

In an embodiment, the DApp 120 of the UE 104 requests blocks 124 to be created from the block foundry server 110. The UE 104 may be configured to notify the DApp 120 to request blocks 124. The DApp 120 may send a request to the block foundry server 110 with a plurality of information to be stored in the requested block 124. The block foundry server 110 may create the block 124 and transmit it to the plurality of consensus servers 108 for validation. Once the plurality of consensus servers 108 validates the block 124, the block 124 may be transmitted to at least one block data store 112 to be stored. The block 124 may also be transmitted back to the UE 104 to be stored in the memory 118.

The chain 122 may store information associated with the UE 104 including device information, provisioning information, and event information. A block 124 may contain fields in which pieces of data are stored. In an embodiment, at least a portion of the chain of blocks 122 may be used to provide embedded subscriber identity module (e-SIM) capabilities to the network 102 in order to authenticate the UE 104 to connect to the network 102. The chain 122 may record events or occurrences that occur internal or external to the UE 104. The UE 104 may comprise sensors (not shown) to evaluate its environment and report the information to the UE 104. The DApp 120 of the UE 104 may request a block 124 to record the events or occurrences to be stored. Due to the secure nature of a chain 122, the chain 122 provides as a trustworthy source of recorded information.

An attempt to modify or delete a block 124 in the chain 122 would invalidate the succeeding blocks 124, thereby rendering the chain 122 corrupt.

Figure 2:
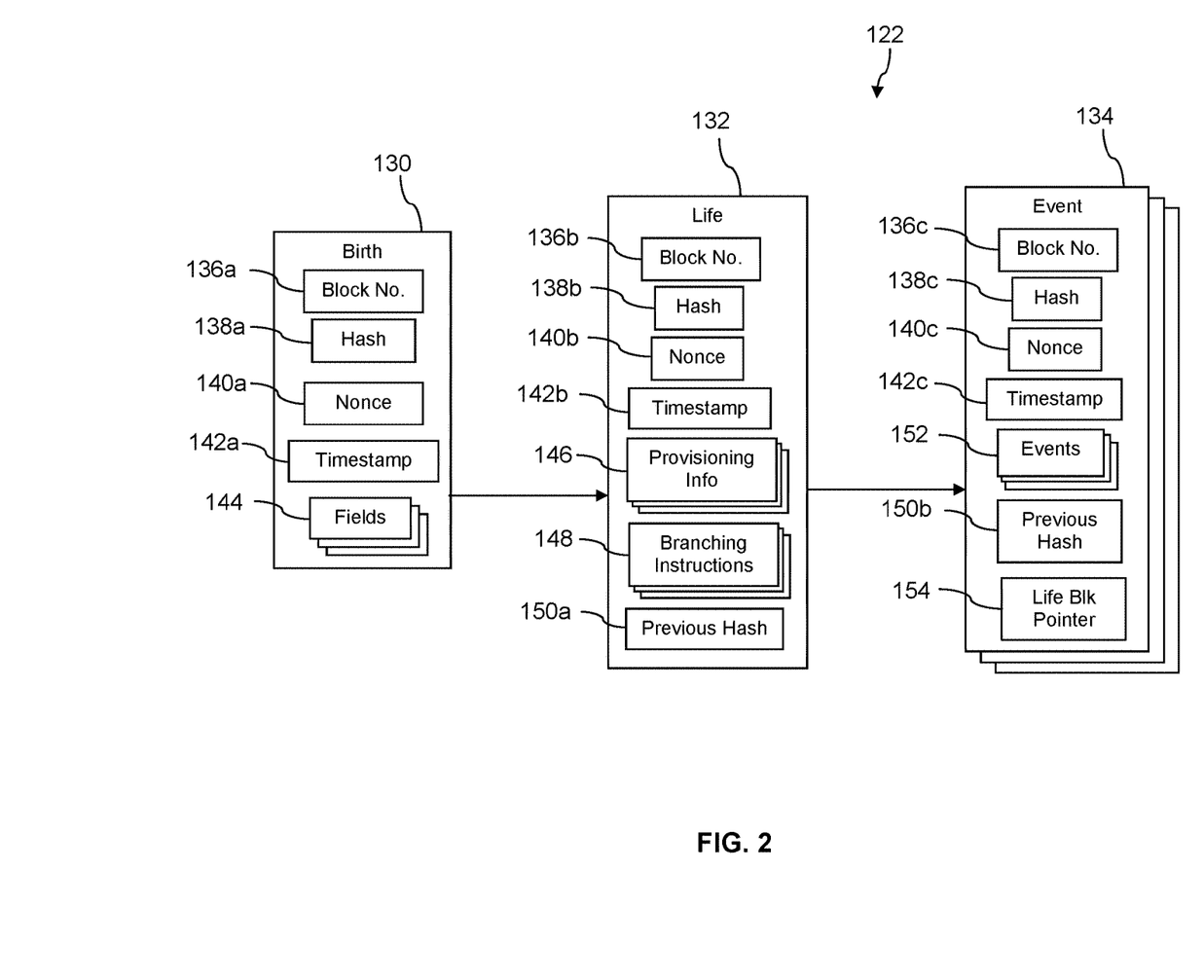
FIG. 2 is a block diagram of an example chain of blocks according to an embodiment of the disclosure.

Turning now to FIG. 2, a chain of blocks 122 is described in further detail. In an embodiment, the chain of blocks 122 on the UE 104 comprise three categories of blocks 124: the first category may be referred as a birth block 130, the second category may be referred to as a life block 132, and the third category may be referred to as an event block 134. A chain of blocks 122 may comprise of one birth block 130, which may be the first block in the chain 122. In an embodiment, the birth block 130 is created by an original equipment manufacturer (OEM) of the UE 104. The birth block 130 comprises a block number 136a, a hash 138a, a nonce 140a, a timestamp 142a, and a plurality of fields 144. The plurality of fields 144 may comprise information about the UE 104 including data about the physical components that make up the UE 104. For example, the plurality of fields 144 may comprise one or more hardware component serial numbers, the media access control (MAC) address of the UE 104, the international mobile equipment identity (IMEI) and other information related to the UE 104 such as the date of manufacture, the time of manufacture, the location of manufacture, the name of manufacturer, and/or the purpose of device, wherein each field comprises one piece of data about the device.

The birth block 130 may be created by the OEM of the UE 104 through the block foundry server 110. The OEM may send a request comprising a plurality of information about the UE 104 to create a birth block 130 to the block foundry server 110. The block foundry server 110 may create the birth block 130 comprising the device information preserved in a plurality of fields 144 as well as a block number 136a, a hash 138a, a nonce 140a, and a timestamp 142a. The hash 138a may be the result of processing the information of the birth block 130 with a hash function (e.g., SHA-1, SHA-256, SHA-512, SHA-3) to a string with a fixed size (e.g., 32-bit, 64-bit), wherein the same input data yields the same hash 138a. The nonce 140a may be incrementally varied in order for the hash 138a to satisfy a target hash value. The target hash value may comprise the hash 138a having a certain number of leading zeroes. Once the birth block 130 is successfully produced by the block foundry server 110, it may be sent to the plurality of consensus servers 108 for validation.

In an embodiment, the network 102 comprises three or more consensus servers 108. In order to validate the birth block 130 or a block 124 in general, a majority (50%+1) of the plurality of consensus servers 108 agree to validate the birth block 130. After validation, the birth block 130 is sent to the block data store 112 to be stored in the network 102. The birth block 130 may further be sent to the UE 104 to be stored in a non-transitory memory 118 of the UE 104. The birth block 130 may be created when the UE 104 is assembled by the OEM or shortly after the assembly of the UE 104. The UE 104 may comprise hardware components from a plurality of manufacturers.

After the UE 104 is manufactured, it may reside temporarily in a stationary state in inventory. The UE 104 may be shipped or transferred from the OEM to a vendor who sells the UE 104 to a customer or user. Upon purchasing the UE 104, the UE 104 may be provisioned for communication on a network 102. For example, in the case of a mobile communication device, the UE 104 may be provisioned for use on the network 102 of a wireless communication service provider. A life block 132 may be created to record provisioning information of the UE 104. The life block 132 may comprise a block number 136b, a hash 138b, a nonce 140b, a timestamp 142b, and the previous hash 150a. The previous hash 150a links the blocks to form a chain 122. For example, the first life block 132 in a chain 122 may comprise a previous hash 150a that is the hash 138a of the birth block 130. The life block 132 may further comprise a plurality of provisioning information 146 and a plurality of branching instructions 148. The provisioning information 146 may include the service provider, the service provider network, subscriber information, the international mobile subscriber identity (IMSI), and the details of the subscription (e.g., data limit, premium communication service capabilities, preferred roaming lists).

The plurality of branching instructions 148 may comprise conditional logic that provide a guideline that determines the circumstances of when the DApp 120 should request an event block 134 or what entities on the network 102 may view the information in the chain 122. In an embodiment, the life block 132 may not have a plurality of branching instructions 148. The service provider may transmit branching instructions 148 in a subsequent life block 132 after the UE 104 is provisioned on the network 102. The life block 132 is sent to be validated by the plurality of consensus servers 108. After the life block 132 is validated, it may be stored in the block data store 112 and/or in the memory 118 of the UE 104 with the birth block 130.

A party on the network 102 may access the chain of blocks 122 of a UE 104. Sometimes, information such as subscriber identity information contained in a chain 122 may be considered confidential or a user of the UE 104 may not desire external parties to view the information. In an embodiment, a portion of the information stored in a birth block 130, a life block 132, or an event block 134 may be configured so that a party belonging to a whitelist of approved parties may view the information. Alternatively, the fields may be configured so that a party belonging to a blacklist of prohibited parties may not gain access to the private information of a block 124. For example, the service provider of the UE 104 on the whitelist may be able to view the private information, while a competitor of the manufacturer of the UE 104 may be on the blacklist. Therefore, the competitor would not be able to view the private information.

In an embodiment, at least a part of the combination of the birth block 130 and life block 132 may provide e-SIM capabilities for the UE 104. The UE 104 may provide the e-SIM information to the network 102 for authentication purposes (e.g., send authentication credentials to the eNB 106 to obtain a wireless communication link). In another embodiment, the network 102 may search for the e-SIM information on the UE 104 or on the block data store 112. The e-SIM information may be encrypted on the chain 122. The UE 104 may comprise an application (not shown) that decodes the encrypted e-SIM information, and the UE 104 may then provide the e-SIM credentials to the network 102 via an eNB 106. Alternatively, the eNB 106 may be configured to look for the e-SIM information on the UE 104 and decrypt the e-SIM information. For example, a software component or hardware component of the eNB 106 may be configured to access the UE 104 in order to find and decode the e-SIM information.

The UE 104 may operate on and communicate with other UEs 104 through the network 102 after it is provisioned. The chain 122 may record event information that occur in event blocks 134. An event block 134 comprises a block number 136c, a hash 138c, a nonce 140c, a timestamp 142c, a plurality of events 152, and a previous hash 150b. Event information may vary depending on the type of UE 104. In an embodiment, the service provider or user may determine what event information the UE 104 should record. The service provider may send branching instructions 148 to the UE 104 in a provisioning payload. A new life block 132 may be created and stored on the chain 122. An event or a plurality of events may trigger at least one of the branching instructions 148 to notify the DApp 120 to request an event block 134 from the block foundry server 110. A branching instruction 148 may decide that the DApp 120 should be notified when an event reaches predetermined quantity occurrences. For example, a sensor on a car may notify the DApp 120 when the engine is started every one hundred, two hundred, five hundred, one thousand, or any number of times. Alternatively, a branching instruction 148 may trigger a DApp 120 notification to request an event block 134 when a certain amount of time elapses, for example, every week, every month, every six months, every year, or any amount of time.

In an embodiment, an event block 134 may comprise a life block pointer 154. The life block pointer 154 may identify the most recent life block 132 in the chain 122 in the case more than one life block 132 comprising provisioning information 146 exists on a chain 122. The birth block 130 and the most recently created life block 132 may be considered to have accurate e-SIM information. The ability of the event block 134 to identify the most recently created life block 132 would allow the network 102 to authenticate the UE 104 more efficiently. The life block pointer 154 may be a unique reference to the life block 132 such as one of a block number 136b or a hash 138b. The life block pointer 154 may not necessarily provide extensive details about the life block 132 of which it references. Instead, it allows for a network 102 or another entity to more easily locate the most recent life block 132 rather than searching backwards through the chain 122 block-by-block. Although not shown, in some embodiments an event block 134 may also comprise a birth block pointer that identifies the birth block 130. Since the birth block 130 is the first block in the chain 122, the network and other entity may be configured to provide the first block of the chain 122.

Figure 3:
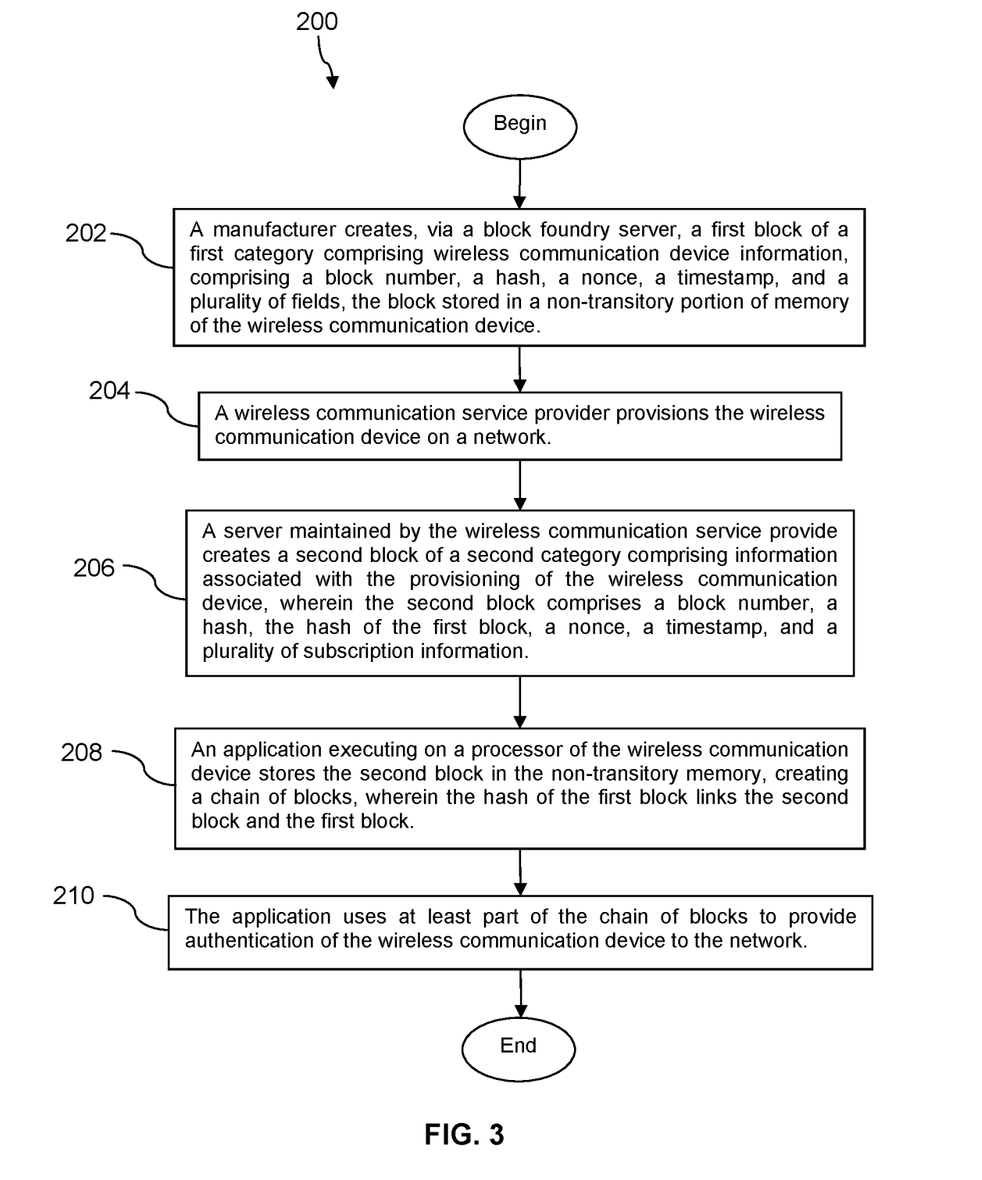
FIG. 3 is a flow chart of a method according to an embodiment of the disclosure.

Turning now to FIG. 3, a method 200 is described. At block 202, a manufacturer creates, via a block foundry server, a first block of a first category comprising wireless communication device information, comprising a block number, a hash, a nonce, a timestamp, and a plurality of fields, the block stored in a non-transitory portion of memory of the wireless communication device. The plurality of fields may comprise information about the wireless communication device. In an embodiment, the manufacturer may be an original equipment manufacturer (OEM) of the wireless communication device. At block 204, a wireless communication service provider provisions the wireless communication device on a network. At block 206, a server maintained by the wireless communication service provide creates a second block of a second category comprising information associated with the provisioning of the wireless communication device, wherein the second block comprises a block number, a hash, the hash of the first block, a nonce, a timestamp, and a plurality of subscription information. The plurality of subscription information may include details of the provisioning of the wireless communication device. Subscription information may differ depending on the type of wireless communication device that is provisioned on the network.

At block 208, an application executing on a processor of the wireless communication device stores the second block in the non-transitory memory, creating a chain of blocks, wherein the hash of the first block links the second block and the first block. In an embodiment, at least part of combination of the first block of the first category and the second block of the second category may provide e-SIM capabilities. At block 210, the application uses at least part of the chain of blocks to provide authentication of the wireless communication device to the network. In an embodiment, the block foundry server may create at least one block of a third category comprising a block number, a hash, the hash of the previous block, a nonce, a timestamp, and a plurality of event information records. The block foundry server may receive a request to create the block of the third category from the wireless communication device.

Figure 4:
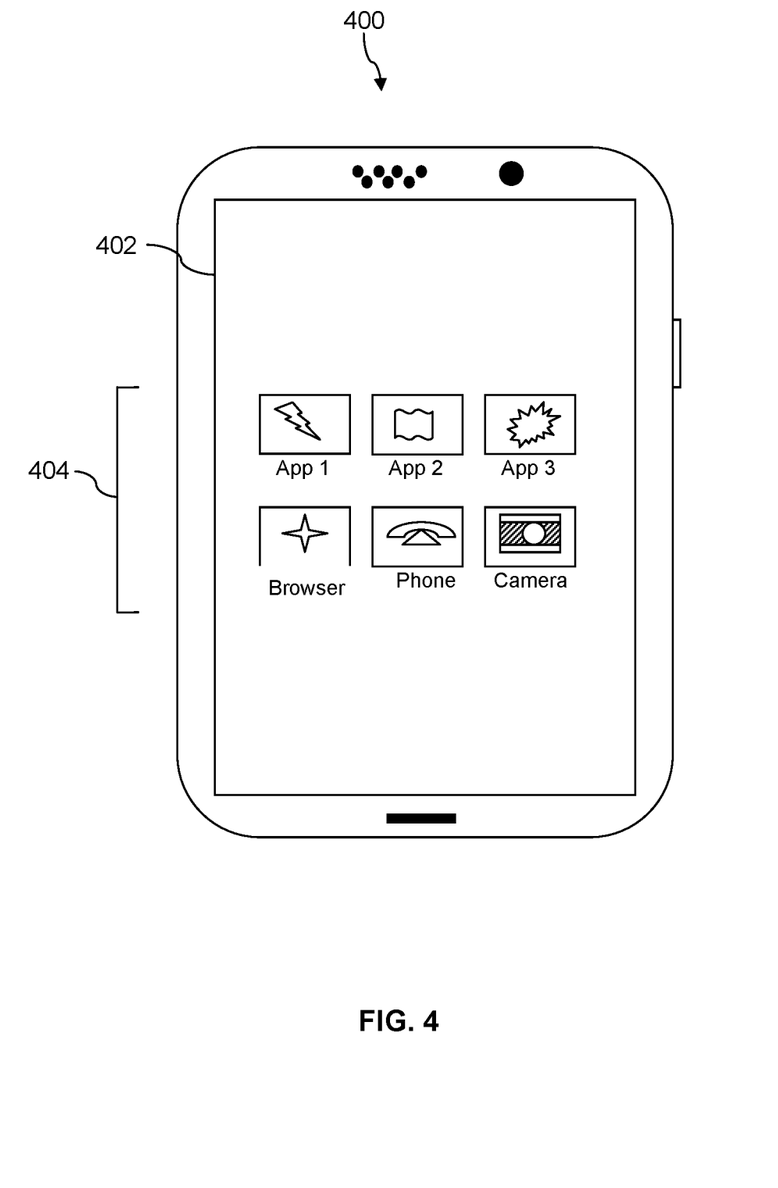
FIG. 4 is an illustration of a user equipment (UE) according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
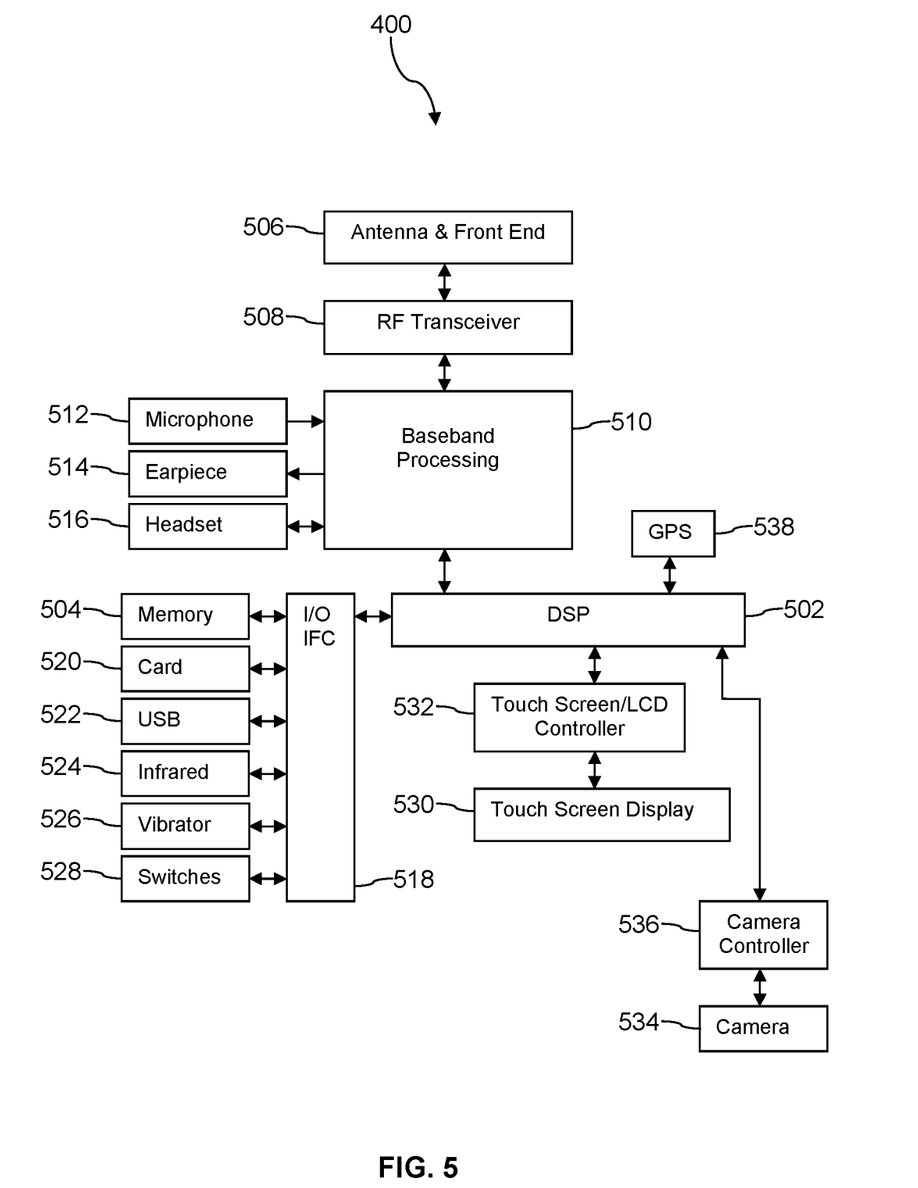
FIG. 5 is a block diagram of a hardware architecture according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
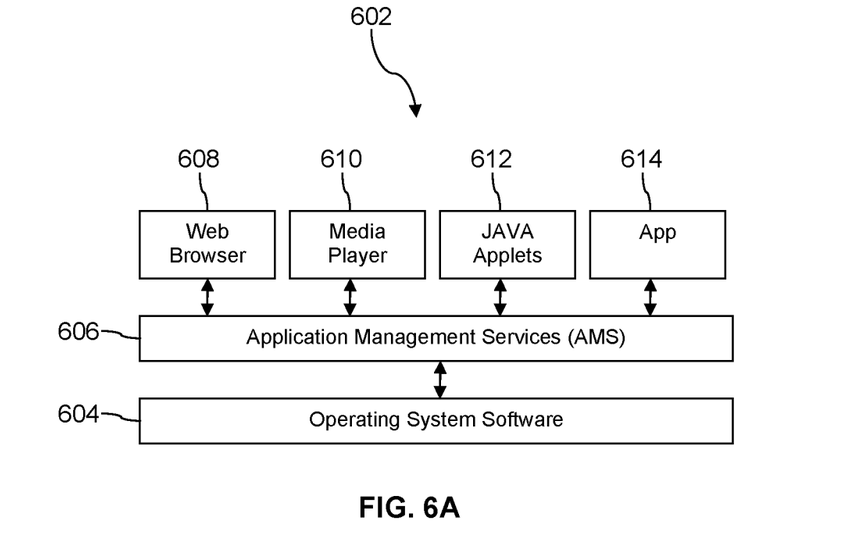
FIG. 6A is a block diagram of a software architecture according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
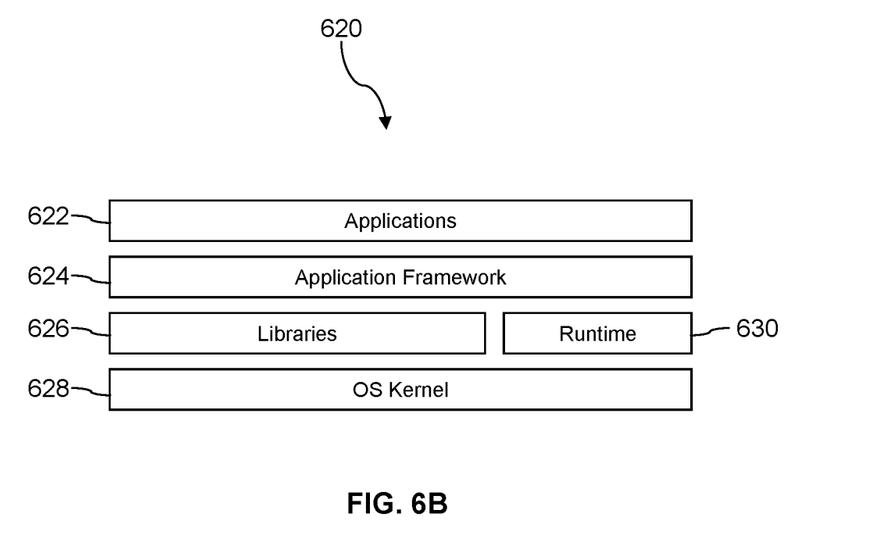
FIG. 6B is a block diagram of a software architecture according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
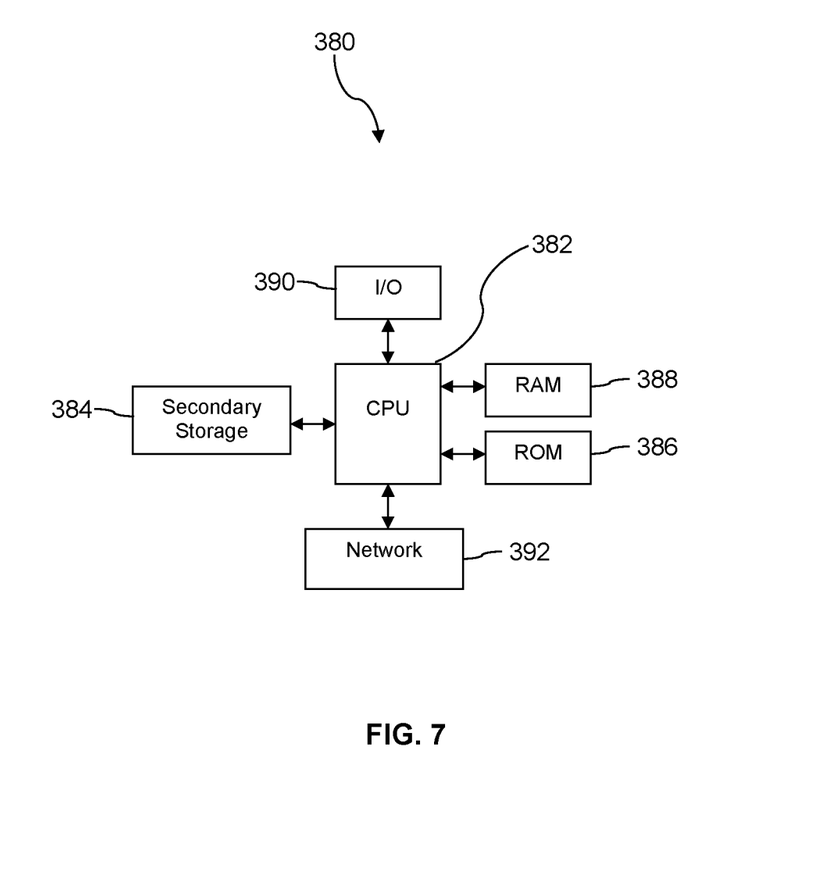
FIG. 7 is block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of storing provisioning data and device information using distributed ledger technology (DLT), the method comprising:
   creating, by a manufacturer via a block foundry server, a first block of a first category comprising wireless communication device information, comprising a block number, a hash, a nonce, a timestamp, and a plurality of fields, the block stored in a non-transitory portion of memory of the wireless communication device;
   provisioning, by a wireless communication service provider, the wireless communication device on a network;
   creating, by a server maintained by the wireless communication service provider, a second block of a second category comprising information associated with the provisioning of the wireless communication device, wherein the second block comprises a block number, a hash, the hash of the first block, a nonce, a timestamp, and a plurality of subscription information;
   storing the second block by an application executing on a processor of the wireless communication device in the non-transitory memory, creating a chain of blocks, wherein the hash of the first block links the second block and the first block; and
   using at least part of the chain of blocks by the application to provide authentication of the wireless communication device to the network.

2. The method of claim 1, wherein the manufacturer that created first block of the first category is an original equipment manufacturer (OEM) of the wireless communication device.

3. The method of claim 1, wherein the wireless communication device information comprises at least three of a hardware component serial number, a media access control (MAC) address of the wireless communication device, an international mobile equipment identity (IMEI), a date of manufacture, a time of manufacture, a location of manufacture, the name of manufacturer, or a purpose of the wireless communication device.

4. The method of claim 1, wherein the provisioning information comprises at least three of a service provider, the service provider network, the international mobile subscriber identity (IMSI), a phone number, or the subscription details.

5. The method of claim 1, wherein at least part of the combination of the first block and second block provide information associated with an embedded subscriber identity module (eSIM).

6. The method of claim 1, wherein the wireless communication device is one of a mobile phone, a personal digital assistant (PDA), a media player, a wearable computer, a headset computer, a laptop computer, a tablet computer, a notebook computer, or an Internet of Things (IoT) device.

7. The method of claim 1, wherein the wireless communication device establishes a communicative link to the network by one of a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

8. The method of claim 1, wherein the second block further comprises at least one branching instruction, and wherein the branching instruction comprises block creation request logic and block access logic.

9. The method of claim 8, further comprising when triggered by the block creation request logic of the at least one branching instruction, sending, by the application executing on the processor, a block creation request to the block foundry server.

10. The method of claim 8, wherein when access is requested to view the chain of blocks, the block access logic of the at least one branching instruction determines to grant the viewing access.

11. The method of claim 1, wherein the chain of blocks comprises three categories of blocks.

12. The method of claim 1, wherein the provisioning information comprises at least one of a service provider, the service provider network, the international mobile subscriber identity (IMSI), a phone number, or the subscription details.

13. The method of claim 1, further comprising storing the chain of blocks on at least one block data store in the network.

14. The method of claim 1, further comprising creating, by the block foundry server, at least one block of a third category comprising a block number, a hash, the hash of the previous block, a nonce, a timestamp, and a plurality of event information records.

15. The method of claim 1, wherein the second block further comprises at least one of a branching instruction, and wherein the at least one branching instructions is one of a block creation request logic or block access logic.

16. The method of claim 15, wherein the at least one branching instruction is the block creation request logic, and the method further comprising:
receiving at least one triggering event that triggers the block creation request logic by the wireless communication device;
notifying the application by the wireless communication device of the triggering event;
transmitting by the application a block creation request comprising information associated with the triggering event to the block foundry server;
creating a third block of a third category by the block foundry server, the third block comprising a block number, a hash, the hash of the previous block, a nonce, a timestamp, and at least one of an event information associated with the triggering event;
sending the third block to the wireless communication device by the block foundry server; and
storing the third block by the application in the non-transitory memory of the wireless communication device.

17. The method of claim 15, wherein the at least one branching instruction is the block access logic, the method further comprising:
receiving at least one block access request to view at least one block on the chain of blocks by a network party, wherein the at least one block of the chain of blocks comprises at least one restricted field;
evaluating the block access logic by the wireless communication device, wherein the block access logic identifies a whitelist, and wherein network parties on the whitelist may view the restricted field; and
based on the evaluation, allowing the network party to view the restricted field.

18. The method of claim 15, wherein the at least one branching instruction is the block access logic, wherein the block access logic identifies a blacklist of network parties, and wherein the network parties on the blacklist may not view a restricted field.

19. The method of claim 14, further comprising:
after creating the at least one block of the third category by the block foundry server, transmitting the at least one block by the block foundry server to a plurality of consensus servers in the network;
validating the at least one block by the plurality of consensus servers;
sending the validated at least one block to the wireless communication device by the plurality of consensus servers; and
storing the validated at least one block by the application in the non-transitory memory of the wireless communication device.

20. The method of claim 19, wherein three or more consensus servers validate the at least one block, and wherein a majority of consensus servers (50%+1) agree to validate the at least one block.

* * * * *